United States Patent [19]

Barn

[11] Patent Number: 4,652,809

[45] Date of Patent: Mar. 24, 1987

[54] SWITCHED REGULATOR CIRCUIT HAVING AN EXTENDED DUTY CYCLE RANGE

[75] Inventor: Belwinder S. Barn, Burnaby, Canada

[73] Assignee: Microtel Limited, Burnaby, Canada

[21] Appl. No.: 816,650

[22] Filed: Jan. 6, 1986

[51] Int. Cl.$^4$ .............................................. G05F 1/46
[52] U.S. Cl. ..................................... 323/282; 363/21; 363/56
[58] Field of Search .................. 323/271, 282; 363/21, 363/56, 97

[56] References Cited

U.S. PATENT DOCUMENTS

| | | | |
|---|---|---|---|
| 4,268,898 | 5/1981 | Brown | 363/56 X |
| 4,337,404 | 6/1982 | Kindell | 323/271 X |
| 4,370,701 | 1/1983 | Western | 363/56 X |
| 4,389,702 | 6/1983 | Clemente et al. | 363/56 X |

FOREIGN PATENT DOCUMENTS 60-35959  2/1985  Japan ................................... 323/282

OTHER PUBLICATIONS

M. M. Sathe, "Coupled Inductor Lossless Snubber Circuit for a Transistor Switching Converter", IBM Technical Disclosure Bulletin, vol. 26, No. 10A, Mar. 1984, pp. 5210-5213.

Primary Examiner—Patrick R. Salce
Assistant Examiner—Marc S. Hoff
Attorney, Agent, or Firm—Douglas M. Gilbert

[57] ABSTRACT

In a DC switching regulator circuit, a circuit to demagnetize the transformer during OFF periods to extend the duty cycle range of the regulator. The regulator uses a transformer in series with an FET switch device to cause the primary transformer current to be switched ON and OFF in response to the power needs of an electrical load connected to the secondary circuit. A first diode, connected to the junction of the primary winding and a series switch, conducts the demagnetizing energy out of the primary circuit into a shunt connected storage capacitor. A second FET switch, operating out of phase with the first switch, allows the storage capacitor to discharge through an inductor back to the unregulated input source. A shunt diode between the inductor and the second FET switch provides a path for the inductor to discharge through when the second switch opens the path between the storage capacitor and the inductor.

9 Claims, 4 Drawing Figures

SWITCHED REGULATOR CIRCUIT HAVING AN EXTENDED DUTY CYCLE RANGE

BACKGROUND OF THE INVENTION

1. Field of the Invention

The present invention relates to power supplies for electronic circuits and more particularly to a single-ended switched DC voltage or current regulator having an extended duty cycle range, which is sometimes referred to in the industry as a "Bed Converter" (Barn's extended duty cycle converter).

2. Description of the Prior Art

The function of a DC voltage or current regulator (also called a DC converter) is to convert an unregulated source of electrical power into a source of constant DC voltage or current for an electrical load. A common design for a single-ended DC voltage or current regulator employs a transformer to step the voltage or current up or down dependent upon the specific application. The transformer primary circuit is opened and closed for a proportionately variable time to meet upon the power requirements of the transformer secondary circuit. A series-switch element in the primary circuit provides the basic ON/OFF switching action to induce a current flow in the secondary. When the primary circuit is switched OFF it is usually desirable to discharge the energy developed in the transformer core otherwise unwanted voltage surges can result.

A technique that is often used to discharge the core when the primary circuit is open is to employ what is sometimes referred to as a demagnetizing transformer winding. Such a circuit arrangement is shown in FIG. 1. The demagnetizing winding discharges the core through the blocking diode D1. If the turns ratio of the primary and the demagnetizing winding are the same, the maximum duty cycle of the circuit for normal operation is 50%. The ratio of turns on the two windings can be altered to obtain a larger duty cycle range but at the expense of higher voltage surges developed across the series switching element. With a 2-to-1 turns ratio a 75% duty is possible but with a consequential voltage surge on the switch element of three times the maximum input voltage. This requires a higher voltage-rated switching element than what would be otherwise required. This is expensive and in some applications, such as high voltage power supplies, difficult to obtain.

Thus it is an object of the present invention to provide a switching DC regulator capable of operating over a wide range of duty cycles with a minimum amount of stress to associated regulator components.

It is another object of the present invention to provide a switching DC voltage regulator capable of operating over an input voltage range that varies up to 400%.

It is yet another object of the present invention to provide a switching DC voltage regulator capable of operating in a single ended forward converter configuration.

It is a further object of the present invention to provide a switching DC voltage regulator that does not use a power transformer with a demagnetization winding.

SUMMARY OF THE INVENTION

In order to achieve the above objects of the present invention, there is provided, for use with a DC switching regulator circuit, a circuit to demagnetize the regulator transformer during the period when the transformer is switched OFF. The regulator uses a transformer in series with a switching device to cause the primary transformer current to be switched ON and OFF in response to the power needs of an electrical load connected to the secondary circuit. A first diode, connected to the junction of the primary winding and a series switch, conducts the demagnetizing energy out of the primary circuit into a shunt connected storage capacitor. A second switching device, operating out of phase with the first switch, allows the storage capacitor to discharge through an inductor back to the unregulated input source. A shunt diode between the inductor and the second FET switch provides a path for the inductor to discharge through when the second switch opens the path between the storage capacitor and the inductor.

BRIEF DESCRIPTION OF THE DRAWINGS

For a better understanding of the invention as well as other objects and further features thereof, reference is made to the following description which is to be read in conjunction with the accompanying drawings wherein.

DETAILED DESCRIPTION OF THE INVENTION

Figure 1:
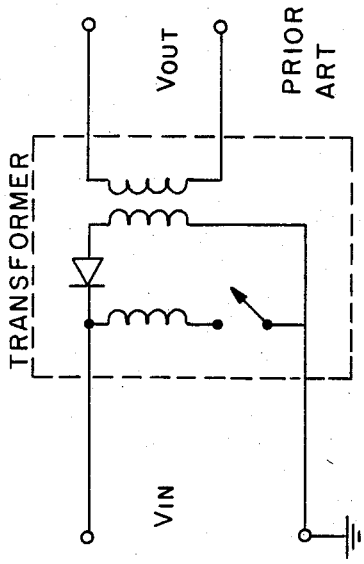
FIG. 1 is an electrical schematic diagram of a prior art technique for demagnetizing the core of a power transformer used in a regulator circuit.
Figure 2:
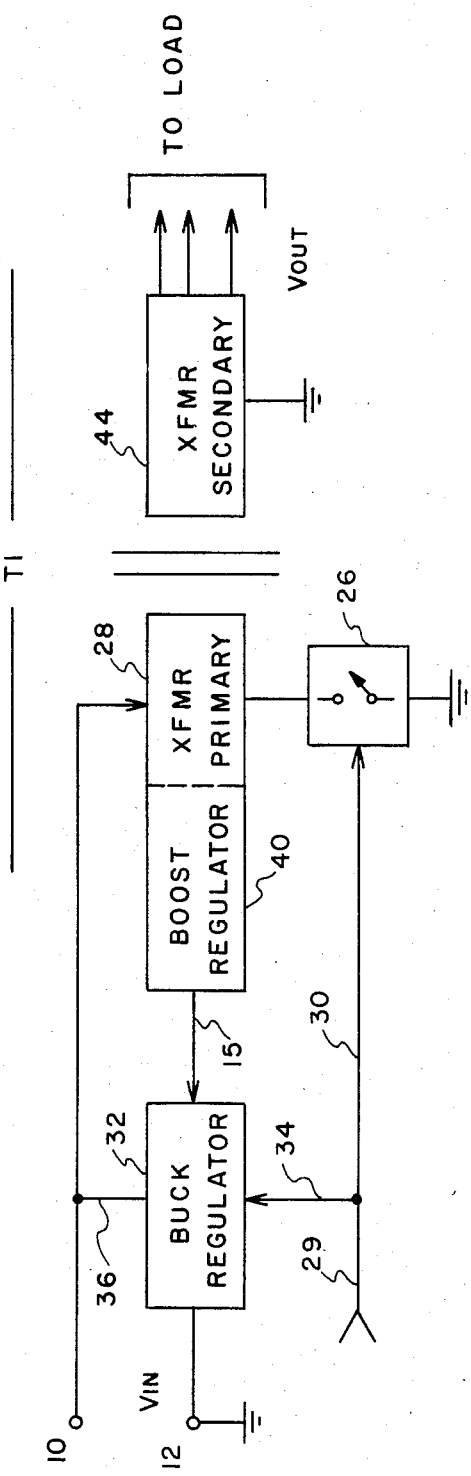
FIG. 2 is a block diagram of a regulator circuit which embodies the techniques of the present invention.

FIG. 2 illustrates a block diagram of the transformer based regulator circuit 25 which overcomes the shortcomings of the prior art voltage regulators. (It should be noted that all references to voltage regulators apply equally to current regulators since either parameter may be detected and stabilized by the present invention.) The input raw DC supply voltage 10 ($V_{in}$) is applied to the primary 28 of transformer T1 as illustrated. In series with primary 28 is a switch element 26 controlled by an external drive signal applied to leads 29 and 30. The drive signal may be derived by any number of techniques that sense the voltage or current parameter at the regulator output ($V_{out1}$ for example). As the power needs of the load on the transformer secondary 44 increase, the drive signal increases proportionately the ON time of switch element 26. The drive signal is also applied to a buck regulator 32 via leads 29 and 34. The output of buck regulator 32 conducts the demagnetizing current from the transformer primary to the input voltage supply connected across the input terminals 10 and 12. With the addition of a capacitor and diode (shown more clearly in FIG. 3), the primary winding 28 and switch 26 form a boost regulator 40. The boost regulator 40 provides a means of taking the magnetizing current and storing it as energy on a capacitor. The buck regulator 32 removes energy processed by the boost regulator 40 and delivers it back to the input source; this assures that the voltage on the capacitor does not increase indefinitely.

Figure 3:
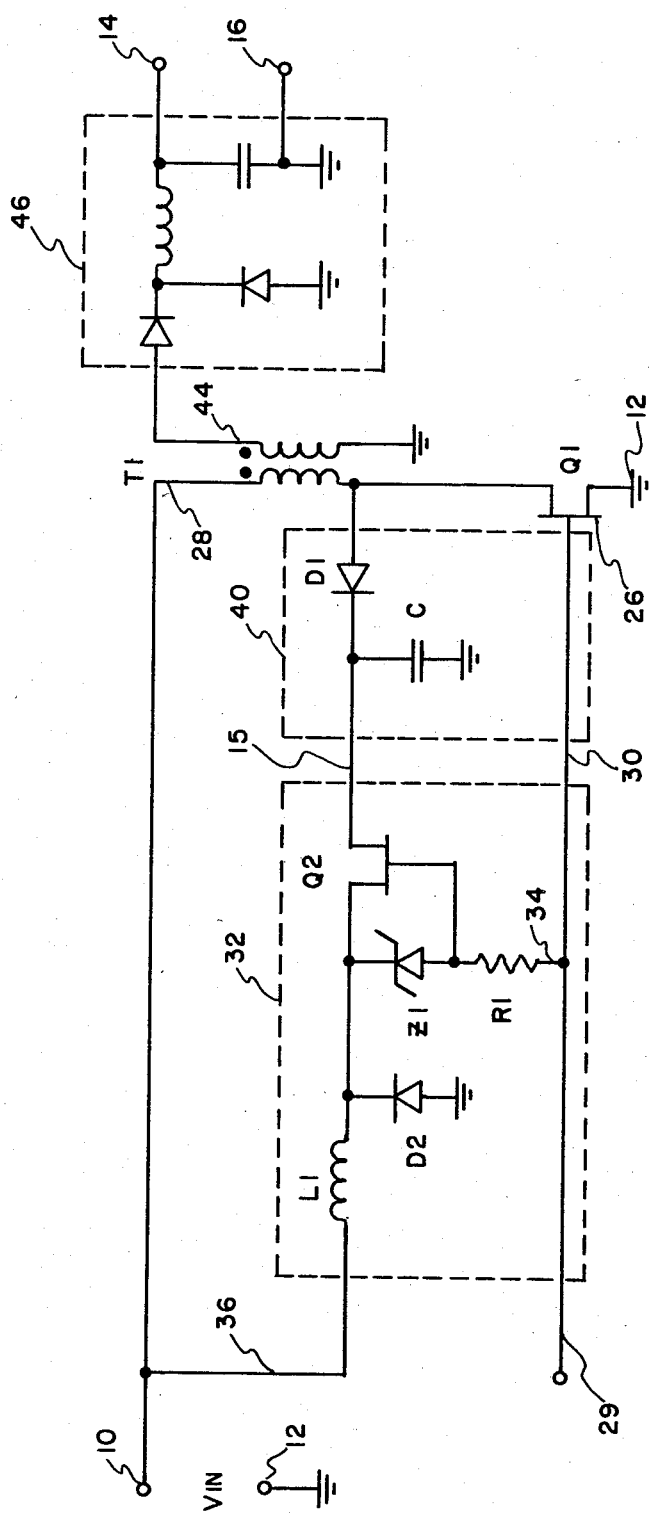
FIG. 3 is an electrical schematic diagram of a regulator circuit which illustrates the present invention.

A more precise understanding of the operation of the circuit may be appreciated in connection with the description of the preferred embodiment shown in FIG. 3.

The advantage of operating at higher duty cycles, as provided by the circuit of the present invention, is that it reduces the RMS currents in the primary circuit of transformer T1 and thus their resistive losses. This is very attractive when FET's are used for the main switching element 26. The large duty cycle range also allows a large input voltage range typically available only with a push-pull converter. An efficient power supply can be made to accept 20 V to 60 V without requiring circuit reconfiguration which is ideal for various applications, such as in telephone central office applications where the supply voltage can be either −24 V or −48 V nominally.

Figure 4:
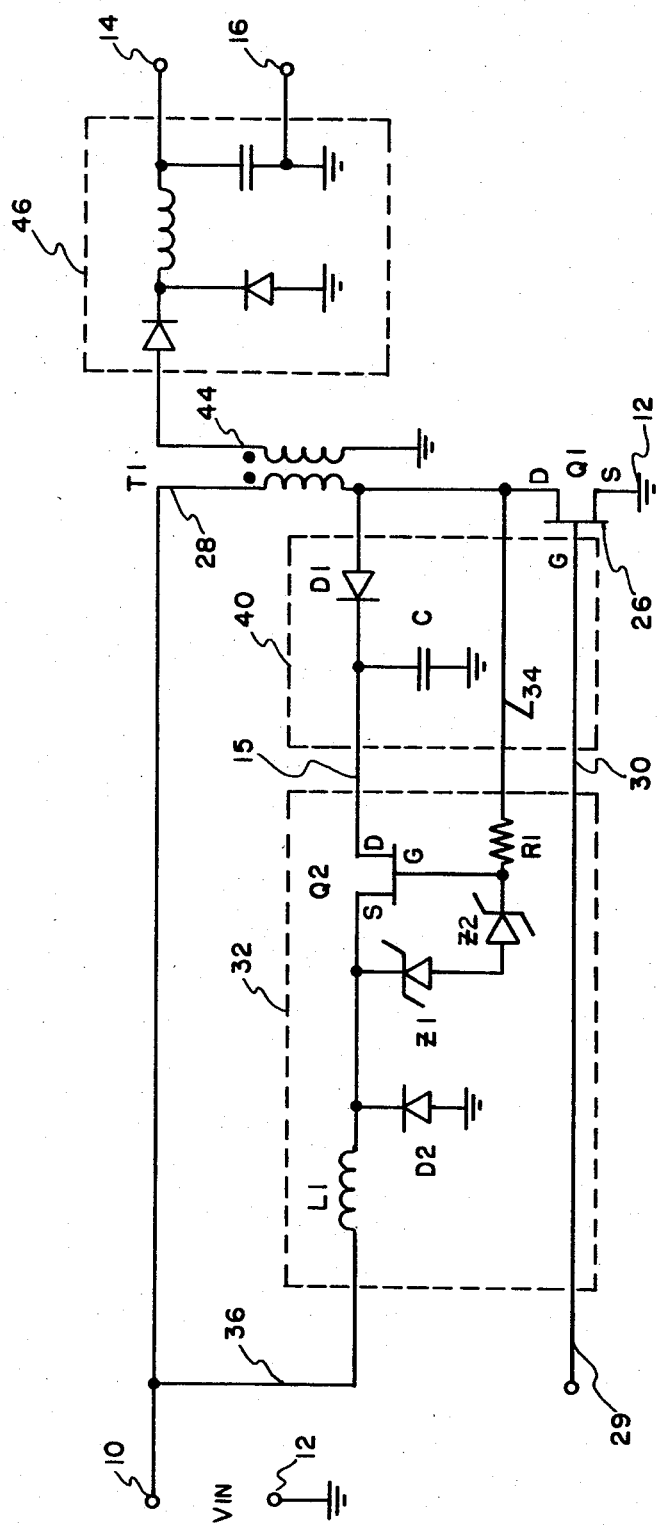
FIG. 4 is an electrical schematic diagram which illustrates an alternate embodiment of the present invention.

The block diagram of FIG. 2 is preferably implemented by the circuit configuration shown in or FIG. 4. Referring to FIG. 3 an input power source would be operatively connected to input terminals 10 and 12, while the load to which power is provided is similarly connected to output terminals 14 and 16. A simple AC rectifier and filter 46 is shown connected to the secondary circuit for illustrating the normal application, however, it is not considered part of the invention. The power transformer T1 is shown with a primary 28 and secondary 44 with the polarity as is indicated. In series with the primary circuit 28 is an N-channel FET switch 26. Also connected to the primary circuit is the boost regulator (shown in FIG. 2 as 40). More precisely a common boost regulator would consist of the magnetizing inductance of T1 in conjunction with the transistor switch Q1, steering diode D1 and storage capacitor C. Connected to the output of the boost regulator 40 is buck regulator 32. The buck regulator is formed by a P-channel FET Q2, diode D2 and inductor L1 with the voltage across the storage capacitor C being the input voltage source to the buck regulator. (Z1 and R1 are bias components for Q2.) The output of the buck regulator is returned to the input terminal 10 via lead 36. The function of each of these components is best understood by examining what occurs to the voltages and currents as Q1 and Q2 switch ON and OFF.

An external control signal applied to the gate electrodes of both Q1 and Q2 via lead 29 drives the devices in and out of saturation causing both to function as simple switches. Since Q1 and Q2 are N and P-channel devices, respectively, Q2 will be ON when Q1 is OFF, i.e. their operation is complementary. When Q1 is ON current flows through the primary winding 28 and Q1 to ground. (For purposes of this discussion $V_{in}$ is assumed to be a positive voltage.) So long as Q1 is ON, D1 remains reversed biased, since the source-to-drain voltage of Q1 is very low. When Q1 turns OFF, the voltage across primary 28 reverses causing D1 to immediately become forward biased. The current in the primary thus goes to charge C while Q1 is OFF. With Q2 ON the current charging C will also be conducted through Q2 and L1 to the supply connected across input terminals 10 and 12. The voltage on C adjusts to a value that just discharges T1 during the OFF time of Q1 (during steady state operation). The net effect of this is to reduce the voltage build up across C ($V_c$) and across Q1, and to conserve the dissipated energy through D1 by returning it to the source. When Q1 turns back ON and Q2 turns OFF, D2 provides a current path for L1 to dissipate or de-energize the energy stored therein.

Alternatively L1 and D2 (in combination with capacitor C) may be functionally viewed as a smoothing filter with an input at terminal 15. The voltage at the function of D1 and Q1 is a square wave. When Q2 turns ON a large potential difference exists between the capacitor C and the supply terminal 10. Even if Q2 had the current carrying capability to handle the surge to the voltage source $V_{in}$, (assuming L1 and D2 were not in the circuit) $V_c$ would always be at $V_{in}$ when Q1 initially turned OFF. This cannot be permitted since it is necessary to apply a voltage of opposite polarity to the transformer T1 to achieve demagnetization. Thus $V_c$ has to be maintained at some other level than $V_{in}$. The function of buck regulator 32 assures that $V_c$ is at the optimum level for demagnetization. If $V_c$ rises too high (caused by a change in the duty) more current would flow through Q2 to the input terminal 10 to bring $V_c$ down to the correct level. And if $V_c$ is initially too low, then less current would flow through Q2 to increase $V_c$. In essence, a self-adjusting effect is provided.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

The circuit configuration shown in FIG. 4 shows a typical modification that could be made without departing from the spirit of this invention. In FIG. 4 Q2 is shown as an N-channel device and is biased through R1 to the drain electrode of Q1 via lead 34. This configuration has the advantage of permitting the regulator to operate over a slightly wider input voltage range than the regulator circuit shown in FIG. 3. Zener diodes Z1 and Z2 are protective devices connected across the source-gate channel to protect Q2 from voltage surges when switching ON to OFF and OFF to ON. Z2 is sized below the reverse (breakdown) voltage $V_{GS}$ of Q2 to insure that $V_{GS}$ is not exceeded when Q2 is switched OFF. And, Z1 protects the same gate-to-source channel when Q2 is switched back ON.

Finally there may be applications where Q2 may be controlled and biased via an external source (not shown), in which event Z1, Z2, and R1 may not be required.

What is claimed is:

1. A high efficiency DC regulator for converting an unregulated DC power source into a source of regulated power for an electrical load, said regulator comprising:
   first and second terminals for connection across said unregulated DC power source, said second terminal being at a common ground potential;
   transformer means having a primary winding with third and fourth terminals and a secondary winding, said third terminal for connection to said first terminal;
   coupling means connected between said secondary winding and said electrical load for coupling energy out of said secondary winding into said load;
   first switching means connected in series with said primary winding between said fourth terminal of said primary winding and said second power terminal, said first switching means exhibiting a CLOSED and OPENED state of variable duty cycle in response to the power needs of said load, said CLOSED and OPENED states causing said transformer means to have a charging and discharging period corresponding in duration to said CLOSED and OPENED states, respectively;

energy storage means having an input and an output, said input connected to said fourth terminal, said energy storage means during said discharging period removing energy stored in said transformer means during said charging period;

second switching means having an input and an output, said second switching means input connected to said energy storage means output and said second switching means output connected to said first terminal, and second switching means conducting energy out of said energy storage means only during said OPENED state and conducting energy continuously back to said unregulated DC power source during both OPENED and CLOSED states; and said energy storage means and second switching means by removing energy stored in said transformer means during said discharing period permitting operation of the regulator at duty cycles above and below 50%.

2. A DC regulator as in claim 1 wherein said coupling means further comprises:

AC rectifier means operatively connected to said secondary winding and to said load for providing regulated DC output power to said load.

3. A DC regulator as in claim 1 wherein said first switching means further comprises a first three electrode FET transistor operatively connected as a switching device across said fourth terminal and said second terminal.

4. A DC regulator as in claim 3 wherein said energy storage means further comprises:

first diode means connected between said fourth terminal and said second switching means input, said diode means conducting energy out of said primary circuit during said discharging period and blocking conduction during said charging period; and a storage capacitor connected across said second terminal and said second switching means input, said capacitor storing energy from said transformer during said discharging period and releasing its stored energy during said charging period.

5. A DC regulator as in claim 4 wherein said second switching means further comprises;

inductor means having an input and an output terminal, said output terminal being connected to said first terminal;

a second three electrode transistor operatively connected between said energy storage means output and said inductor means input, said second transistor means having OPENED and CLOSED states oppositely timed to said states of said first transistor means and permitting said storage capacitor to discharge when said second transistor is in an OPENED state; and second diode means connected between said inductor means input and said second power terminal, said diode means permitting said inductor means to discharge during the period when said second transistor means is in said OPENED state.

6. A DC regulator as in claim 5 wherein said DC power source further comprises an unregulated DC voltage source.

7. In a DC switching regulator circuit for converting an unregulated DC power source into a source of regulated power having a transformer with primary and secondary windings and also having a switch connected in series with the primary winding causing the primary current to be switched ON and OFF in response to the power needs of an electrical load connected to the secondary winding, a circuit for demagnetising the transformer during the OFF periods comprising:

first and second power terminals for connection across said unregulated DC power source and for connection in parallel across said series connected transformer and said series switch, said second power terminal being at a common ground potential;

first diode means having an input and an output, said input connected to the junction of said primary winding and said series switch, said diode means conducting energy out of said primary circuit during said OFF period and blocking conduction during said ON period;

a storage capacitor connected across said second terminal and said first diode means output, said capacitor storing energy from said transformer during said OFF period;

inductor means having an input and an output terminal, said output terminal being connected to said first power terminal;

switching means operatively connected between said inductor means input terminal and said first diode means output, said switching means having OPENED and CLOSED states oppositely timed to said states of said series switch and permitting said storage capacitor to discharge when said switching means is in an OPENED state, and second diode means connected between said inductor means input and said second power terminal, said diode means permitting said inductor means to discharge during the period when said switching means is in said OPENED state, and thereby causing the demagnetization of the transformer during OFF periods.

8. A demagnetizing circuit as in claim 7 wherein said switching means further comprises:

a P-channel FET device; and bias means for biasing said device ON during said CLOSED state and OFF during said OPENED state.

9. A demagnetizing circuit as in claim 7 wherein said switching means further comprises:

an N-channel FET device; and bias means for biasing said device ON during said CLOSED state and OFF during said OPENED state.

* * * * *